US00RE45103E

(19) United States
(12) Reissued Patent
Ahn et al.

(10) Patent Number: US RE45,103 E
(45) Date of Reissued Patent: Sep. 2, 2014

(54) METHOD FOR RECEIVING CONTROL INFORMATION IN ORTHOGONAL FREQUENCY DIVISION MULTIPLEXING SYSTEM OF MOBILE COMMUNICATION SYSTEM

(71) Applicant: LG Electronics Inc., Seoul (KR)

(72) Inventors: Joon Kui Ahn, Seoul (KR); Young Woo Yun, Seoul (KR); Ki Jun Kim, Seoul (KR); Eun Sun Kim, Jeonju-si (KR); Dae Won Lee, Suwon-si (KR); Dong Youn Seo, Seoul (KR); Suk Hyon Yoon, Seoul (KR)

(73) Assignee: LG Electronics Inc., Seoul (KR)

(21) Appl. No.: 13/941,313

(22) Filed: Jul. 12, 2013

Related U.S. Patent Documents

Reissue of:
(64) Patent No.: 8,009,760
Issued: Aug. 30, 2011
Appl. No.: 12/942,968
Filed: Nov. 9, 2010

U.S. Applications:
(63) Continuation of application No. 13/941,277, filed on Jul. 12, 2013, which is an application for the reissue of Pat. No. 8,009,760, which is a continuation of application No. 12/143,647, filed on Jun. 20, 2008, now Pat. No. 8,019,017.

(60) Provisional application No. 60/945,585, filed on Jun. 21, 2007, provisional application No. 60/946,400, filed on Jun. 27, 2007.

(30) Foreign Application Priority Data

Nov. 29, 2007 (KR) ..... 10-2007-0122985

(51) Int. Cl.
*H04L 27/00* (2006.01)
*H04B 7/216* (2006.01)

(52) U.S. Cl.
USPC ..... 375/295; 370/342

(58) Field of Classification Search
USPC ..... 375/295, 219, 260, 267, 300; 370/280, 370/329, 336, 342; 455/101, 509; 714/718
See application file for complete search history.

(56) References Cited

U.S. PATENT DOCUMENTS 5,870,391 A 2/1999 Nago
6,452,936 B1 9/2002 Shiino (Continued)

FOREIGN PATENT DOCUMENTS

CN 1829373 9/2006
EP 1185001 3/2002

(Continued)

OTHER PUBLICATIONS

European Patent Office Application Serial No. 13185491.1, Search Report dated Nov. 7, 2013, 8 pages.

(Continued)

*Primary Examiner* — Khai Tran
(74) *Attorney, Agent, or Firm* — Lee, Hong, Degerman, Kang & Waimey

(57) ABSTRACT

The present invention relates to receiving control information in an orthogonal frequency division multiplexing (OFDM) system of a mobile communication system. The present invention includes receiving information related to a number of OFDM symbols in a subframe for receiving first control information, receiving information related to a number of OFDM symbols in the subframe for receiving second control information, decoding the first control information according to the received information related to the number of OFDM symbols in the subframe for receiving the first control information, and decoding the second control information according to the received information related to the number of OFDM symbols in the subframe for receiving the second control information, wherein the number of OFDM symbols for receiving the first control information is less than or equal to the number of OFDM symbols for receiving the second control information.

12 Claims, 6 Drawing Sheets

(56) References Cited

U.S. PATENT DOCUMENTS

| | | | | |
|---|---|---|---|---|
| 6,842,487 | B1 | 1/2005 | Larsson | |
| 6,934,318 | B2 | 8/2005 | Sarkar | |
| 7,069,050 | B2 | 6/2006 | Yoshida | |
| 7,315,577 | B2 | 1/2008 | Shao | |
| 7,336,633 | B2 | 2/2008 | Kruys | |
| 7,386,076 | B2 | 6/2008 | Onggosanusi et al. | |
| 7,954,032 | B2 * | 5/2011 | Kim et al. | 714/748 |
| 7,995,661 | B2 | 8/2011 | Xu et al. | |
| 2001/0005681 | A1 | 6/2001 | Kim | |
| 2001/0034236 | A1 | 10/2001 | Tong et al. | |
| 2003/0039227 | A1 | 2/2003 | Kwak | |
| 2003/0133426 | A1 | 7/2003 | Schein et al. | |
| 2004/0009780 | A1 | 1/2004 | Dick et al. | |
| 2004/0081131 | A1 | 4/2004 | Walton et al. | |
| 2004/0190640 | A1 | 9/2004 | Dubuc et al. | |
| 2005/0083977 | A1 | 4/2005 | Moulsley et al. | |
| 2005/0117536 | A1 | 6/2005 | Cho et al. | |
| 2005/0122898 | A1 | 6/2005 | Jang et al. | |
| 2005/0165949 | A1 | 7/2005 | Teague | |
| 2005/0220000 | A1 | 10/2005 | Kim et al. | |
| 2005/0232181 | A1 | 10/2005 | Park et al. | |
| 2005/0233754 | A1 | 10/2005 | Beale | |
| 2005/0286402 | A1 | 12/2005 | Byun et al. | |
| 2006/0013186 | A1 | 1/2006 | Agrawal et al. | |
| 2006/0045001 | A1 | 3/2006 | Jalali | |
| 2006/0198294 | A1 | 9/2006 | Gerlach | |
| 2006/0209814 | A1 | 9/2006 | Fujii | |
| 2006/0250941 | A1 | 11/2006 | Onggosanusi et al. | |
| 2006/0264218 | A1 | 11/2006 | Zhang et al. | |
| 2006/0274842 | A1 | 12/2006 | Pan et al. | |
| 2006/0280256 | A1 | 12/2006 | Kwon et al. | |
| 2007/0064669 | A1 | 3/2007 | Classon et al. | |
| 2007/0097915 | A1 | 5/2007 | Papasakellariou | |
| 2007/0097942 | A1 | 5/2007 | Gorokhov et al. | |
| 2007/0097981 | A1 | 5/2007 | Papasakellariou | |
| 2007/0110104 | A1 | 5/2007 | Sartori et al. | |
| 2007/0149137 | A1 | 6/2007 | Richardson et al. | |
| 2007/0183533 | A1 | 8/2007 | Schmidl et al. | |
| 2007/0184849 | A1 | 8/2007 | Zheng | |
| 2007/0206559 | A1 | 9/2007 | Cho et al. | |
| 2007/0208986 | A1 | 9/2007 | Luo et al. | |
| 2007/0211667 | A1 | 9/2007 | Agrawal et al. | |
| 2007/0254662 | A1 | 11/2007 | Khan et al. | |
| 2007/0258373 | A1 | 11/2007 | Frederiksen et al. | |
| 2007/0258540 | A1 | 11/2007 | Ratasuk et al. | |
| 2008/0025247 | A1 | 1/2008 | McBeath et al. | |
| 2008/0025337 | A1 | 1/2008 | Smith et al. | |
| 2008/0090528 | A1 | 4/2008 | Malladi | |
| 2008/0095106 | A1 | 4/2008 | Malladi et al. | |
| 2008/0225784 | A1 | 9/2008 | Tseng | |
| 2008/0225791 | A1 | 9/2008 | Pi et al. | |
| 2008/0227398 | A1 | 9/2008 | Haghighat et al. | |
| 2008/0232307 | A1 | 9/2008 | Pi et al. | |
| 2008/0253469 | A1 | 10/2008 | Ma et al. | |
| 2008/0267158 | A1 | 10/2008 | Zhang et al. | |
| 2008/0304593 | A1 | 12/2008 | Khan et al. | |
| 2008/0310483 | A1 | 12/2008 | Lee et al. | |
| 2009/0046793 | A1 | 2/2009 | Love et al. | |
| 2009/0059884 | A1 | 3/2009 | Zhang et al. | |
| 2009/0060081 | A1 | 3/2009 | Zhang et al. | |
| 2009/0154580 | A1 | 6/2009 | Ahn et al. | |
| 2009/0196279 | A1 | 8/2009 | Kim et al. | |
| 2009/0274037 | A1 | 11/2009 | Lee et al. | |
| 2009/0285163 | A1 | 11/2009 | Zhang et al. | |
| 2009/0310719 | A1 | 12/2009 | Stirling-Gallacher | |
| 2009/0323615 | A1 | 12/2009 | Ihm et al. | |
| 2010/0034163 | A1 | 2/2010 | Damnjanovic et al. | |
| 2010/0098005 | A1 | 4/2010 | Lee et al. | |
| 2010/0260164 | A1 | 10/2010 | Moon et al. | |
| 2011/0002309 | A1 | 1/2011 | Park et al. | |
| 2011/0051841 | A1 | 3/2011 | Ahn et al. | |
| 2012/0106478 | A1 | 5/2012 | Han et al. | |
| 2012/0113945 | A1 | 5/2012 | Moon et al. | |
| 2013/0294282 | A1 * | 11/2013 | Seo | 370/252 |

FOREIGN PATENT DOCUMENTS

| | | |
|---|---|---|
| EP | 1248485 | 10/2002 |
| EP | 1746810 | 1/2007 |
| EP | 1746855 | 1/2007 |
| EP | 2171878 | 4/2010 |
| JP | 04-074026 | 3/1992 |
| JP | 2001044900 | 2/2001 |
| JP | 2002-369258 | 12/2002 |
| JP | 2004-312291 | 11/2004 |
| JP | 2004-364321 | 12/2004 |
| JP | 2005-244960 | 9/2005 |
| JP | 2005253073 | 9/2005 |
| JP | 2005-288300 | 10/2005 |
| JP | 2006166382 | 6/2006 |
| JP | 2007-124682 | 5/2007 |
| JP | 2007-511975 | 5/2007 |
| JP | 2007-221755 | 8/2007 |
| JP | 2008-053858 | 3/2008 |
| JP | 2008-092051 | 4/2008 |
| JP | 2008-092377 | 4/2008 |
| JP | 2008-236018 | 10/2008 |
| JP | 2010-506505 | 2/2010 |
| JP | 2011-193521 | 9/2011 |
| KR | 101999013366 | 2/1999 |
| KR | 10-2002-0009079 | 2/2002 |
| KR | 1020020088085 | 11/2002 |
| KR | 1020030081464 | 10/2003 |
| KR | 1020050021965 | 3/2005 |
| KR | 10-2005-0043302 | 5/2005 |
| KR | 1020050073256 | 7/2005 |
| KR | 10-2005-0120244 | 12/2005 |
| KR | 1020060016600 | 2/2006 |
| KR | 10-2006-0081352 | 7/2006 |
| KR | 10-2006-0092055 | 8/2006 |
| KR | 1020060095576 | 8/2006 |
| KR | 1020070107614 | 11/2007 |
| KR | 1020080023664 | 3/2008 |
| KR | 1020080030905 | 4/2008 |
| KR | 1020080039772 | 5/2008 |
| KR | 1020080065853 | 7/2008 |
| KR | 1020080096088 | 10/2008 |
| KR | 100894142 | 4/2009 |
| KR | 1020090082843 | 7/2009 |
| RU | 2142672 | 10/1999 |
| RU | 2142672 | 12/1999 |
| RU | 2221335 | 1/2004 |
| RU | 2267225 | 12/2005 |
| TW | 545074 | 8/2003 |
| WO | 03/043245 | 5/2003 |
| WO | 03/077579 | 9/2003 |
| WO | 2003/077579 | 9/2003 |
| WO | 03/085858 | 10/2003 |
| WO | 2004/038991 | 5/2004 |
| WO | 2004/049591 | 6/2004 |
| WO | 2005/006250 | 1/2005 |
| WO | 2005/050875 | 6/2005 |
| WO | 2005/060132 | 6/2005 |
| WO | 2005/065062 | 7/2005 |
| WO | 2005/074184 | 8/2005 |
| WO | 20051088869 | 9/2005 |
| WO | 2005099123 | 10/2005 |
| WO | 2005/125140 | 12/2005 |
| WO | 2005119959 | 12/2005 |
| WO | 2006/023192 | 3/2006 |
| WO | 06/069299 | 6/2006 |
| WO | 2006-071050 | 7/2006 |
| WO | 2006/073284 | 7/2006 |
| WO | 2006/102771 | 10/2006 |
| WO | 2007/007380 | 1/2007 |
| WO | 2007/011180 | 1/2007 |
| WO | 2007/052941 | 5/2007 |
| WO | 2007049208 | 5/2007 |
| WO | 2007/078146 | 7/2007 |
| WO | 2008041819 | 4/2008 |
| WO | 2008-133439 | 11/2008 |
| WO | 2009/041785 | 4/2009 |

(56) References Cited

OTHER PUBLICATIONS

Samsung, "Downlink ACK/NACK Transmission Structure," 3GPP TSG RAN WG1 Meeting #49, R1-072247, May 2007, 4 pages.
Intel Corporation, "Text Proposal for downlink OFDMA resource allocation and mapping rules for distributed mode users in E-UTRA, with discussion on control information", 3GPP TSG RAN WG1 #45, R1-061149, May 2006, 7 pages.
Huawei, "E-E-UTRA Downlink L1/L2 Control Channel Structure," 3GPP TSG-RAN-WG1 Meeting #48bis, R1-071689, Mar. 2007, 4 pages.
ETRI, "Downlink L1/L2 control signaling", 3GPP TSG RAN WG1 Meeting #47bis, R1-070079, Jan. 2007, 10 pages (relevant portions: section 5).
Ericsson, et al., "Way Forward on Downlink Control Signaling," 3GPP TSG RAN WG1 Meeting #48, R1-071223, Feb. 2007, 6 pages.
NTT DoCoMo, et al., "Comparison between RB-level and Sub-carrier-level Distributed Transmission for Shared Data Channel in E-UTRA Downlink," 3GPP TSG RAN WG1 Meeting #46, R1-062089, Aug. 2006, 14 pages.
Morimoto, et al., "Transmit Diversity Schemes Suitable for Common Control Channel in Evolved UTRA Downlink," IEEE Technical Report RSC2007-50, Evolved UTRA vol. 107, No. 147, Jul. 2007, pp. 125-130.
Samsung, "Performance of 4-Tx Antenna diversity with realistic channel estimation," 3GPP TSG RAN WG1 Meeting#49, R1-072239, May 2007, 6 pages.
Nortel, "SCH Search Performance with Transmit Diversity," 3GPP TSG-RAN WG1 Meeting on LTE, R1-061843, Jun. 2006, 10 pages.
Qualcomm Europe, "Considerations on Multiplexing of Control and User Data for Xfdma based E-UTRA Uplink Evaluation", 3GPP TSG-RAN WG1 #42bis, R1-051102, XP002446638, Oct. 2005, 6 pages.
Qualcomm Europe, "Mapping of UL ACK Transmission based on DL VRB", 3GPP TSG RAN1 #48, R1-070660, Feb. 2007, 4 pages.
Panasonic, "Assignment of Downlink ACK/NACK Channel," 3GPP TSG-RAN WG1 Meeting #49bis, R1-072794, XP002660823, Jun. 2007, 3 pages.
NTT DoCoMo, et al., "RB-level Distributed Transmission Method for Shared Data Channel in E-UTRA Downlink," 3GPP TSG RAN WG1 Meeting #46, R1-062285, Aug. 2006, 3 pages.
NTT DoCoMo, et al., "Downlink L1/L2 Control Signaling Channel Structure: Mapping," 3GPP TSG RAN WG Meeting #47bis, R1-070104, Jan. 2007, 17 pages.
NTT DoCoMo, et al., "Coding Scheme of L1/L2 Control Channel for E-UTRA Downlink," 3GPP TSG RAN WG1 LTE Ad Hoc, R1-061672, Jun. 2006, 19 pages.
Nortel, "Discussion on linkage of PHICH to uplink transmissions," 3GPP TSG-RAN WG1 Meeting #52, R1-080771, Feb. 2007, 3 pages.
NEC Group, "Efficient Downlink ACK/NACK signalling for E-UTRA," TSG-RAN WG1 #48Bis, R1-071508, Mar. 2007, 3 pages.
LG Electronics, "Downlink Ack/NACK Index Mapping," 3GPP RAN WG1 #48-bis, R1-071552, XP002660818, Mar. 2007, 6 pages.
LG Electronics, "Downlink control signalling," 3GPP TSG RAN WG1 #47, R1-063177, Nov. 2006, 6 pages.
LG Electronics, "Downlink Cat0 signaling for scheduling assignments," 3GPP TSG RAN WG1 #47bis, R1-070247, Jan. 2007, 4 pages.
LG Electronics, "DL ACK/NACK Structure," 3GPP TSG RAN WG1 #49bis, R1-072878, Jun. 2007, 6 pages.
LG Electronics, "Uplink ACK/NACK Index Mapping", 3GPP RAN WG1 #48-bis, R1-071547, XP002660822, Mar. 2007, 6 pages.
Kaiser, et al., "Space frequency block coding in the uplink of broadband MC-CDMA mobile radio systems with pre-equalization", Vehicular Technology Conference, Institute of Electrical and Electronics Engineers, XP10701084, VTC Fall 2003, 5 pages.
LG Electronics, "Downlink resource allocation for localized and distributed transmission", 3GPP TSG RAN WG1 #48bis, R1-071549, Mar. 2007, 3 pages.
Texas Instruments, "Shared Control Channel Structure for E-UTRA Downlink," 3GPP TSG-RAN WG1 #45, R1-061433, May 2006, 5 pages.
Texas Instruments, "Shared Control Channel Structure and Coding for E-UTRA Downlink," 3GPP TSG RAN WG1 LTE Ad Hoc, R1-061740, Jun. 2006, 8 pages.
Sharp, "UE Identity in L1/L2 Downlink Control Signalling," 3GPP TSG-RAN WG1#45, R1-061136, May 2006, 7 pages.
United States Patent and Trademark Office Application Serial No. 13/165,711, Final Office Action dated Aug. 9, 2013, 9 pages.
The State Intellectual Property Office of the People's Republic of China Application Serial No. 200780036950.8, Office Action dated Jan. 31, 2012, 4 pages.
European Patent Office Application Serial No. 08723583.4, Search Report dated Sep. 6, 2011, 6 pages.
European Patent Office Application Serial No. 08723584.2, Search Report dated Oct. 26, 2011, 8 pages.
European Patent Office Application Serial No. 11171776.5, Search Report dated Aug. 24, 2012, 8 pages.
United Kingdom Intellectual Property Office Application Serial No. GB1000405.9, Office Action dated Apr. 5, 2012, 2 pages.
Russian Federation Federal Service for Intellectual Property, Patents and Trademarks Application Serial No. 2009123819/08, Notice of Allowance dated Oct. 14, 2011, 8 pages.
Russian Federation Federal Service for Intellectual Property, Patents and Trademarks Application Serial No. 2010100873/07, Notice of Allowance dated Sep. 22, 2011, 16 pages.
Taiwan Intellectual Property Office Application Serial No. 097122232, Office Action dated Feb. 29, 2012, 7 pages.
Taiwan Intellectual Property Office Application Serial No. 096136988, Office Action dated May 17, 2013, 6 pages.
United States Patent and Trademark Office U.S. Appl. No. 13/166,750, Office Action dated Jul. 26, 2012, 8 pages.
United States Patent and Trademark Office U.S. Appl. No. 13/014,665, Final Office Action dated May 22, 2013, 25 pages.
United States Patent and Trademark Office U.S. Appl. No. 13/165,711, Final Office Action dated Aug. 9, 2013, 9 pages.
United States Patent and Trademark Office U.S. Appl. No. 13/179,319, Notice of Allowance dated Sep. 26, 2011, 7 pages.
United States Patent and Trademark Office U.S. Appl. No. 13/217,204, Notice of Allowance dated Apr. 8, 2013, 8 pages.
United States Patent and Trademark Office U.S. Appl. No. 13/045,455, Office Action dated Dec. 2, 2011, 8 pages.
United States Patent and Trademark Office U.S. Appl. No. 13/190,318, Office Action dated May 21, 2012, 7 pages.
United States Patent and Trademark Office U.S. Appl. No. 13/014,665, Office Action dated Nov. 29, 2012, 24 pages.
United States Patent and Trademark Office U.S. Appl. No. 13/295,974, Office Action dated Jan. 29, 2013, 8 pages.
United States Patent and Trademark Office U.S. Appl. No. 13/295,987, Office Action dated Feb. 6, 2013, 8 pages.
United States Patent and Trademark Office U.S. Appl. No. 13/165,711, Office Action dated Mar. 13, 2013, 10 pages.
United States Patent and Trademark Office U.S. Appl. No. 13/295,884, Office Action dated Mar. 14, 2013, 8 pages.
Su, et al., "Obtaining full-diversity space-frequency codes from space-time codes via mapping," IEEE Transactions on Signal Processing, vol. 51 No. 11, XP-011102805, Nov. 2003, pp. 2905-2916.
Samsung, "Transmit Diversity for 4-Tx Antenna", 3GPP TSG RAN WG1 Meeting #49, R1-072238, XP-002578959, May 2007, 5 page.
Zhang, et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14 No. 3, XP-011189164, Jun. 2007, pp. 32-43.
Kim, et al., "Transmit Diversity and Multiplexing Methods for 3G-LTE Downlink Control Channels," 64th IEEE Vehicular Technology Conference, XP-031051218, Sep. 2006, 4 pages.
Ryu, "System Design and Analysis of MIMO SFBC CI-OFDM System against the Nonlinear Distortion and Narrowband Interference," IEEE Transactions on Consumer Electronics, vol. 54, No. 2, May 2008, pp. 368-375.

(56) References Cited

OTHER PUBLICATIONS

Ryu, H.G., et al., "Design and Performance Evaluation of the MIMO SFBC CI-OFDM Communication System," The Fourth International Conference on Wireless and Mobile Communications, Jul. 2008, pp. 60-64.
Panasonic, "Mapping Position of Control Channel for Uplink SC-FDMA", TSG-RAN WG1 #43, Doc. No. R1-051395, XP-002450961, Nov. 2005, 6 pages.
3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007, 12 pages.
Zhang, et al., "Space-Frequency Block Code with Matched Rotation MIMO-OFDM System with Limited Feedback", EURASIP Journal on Advances in Signal Processing, Jun. 2009, 16 pages.
Zhang, et al., "Universal Space-Frequency Block Coding for MIMO-OFDM Systems", IEEE Asia-Pacific Conference on Communications, pp. 227-231, Oct. 2005, 5 pages.
Motorola, "E-UTRA Downlink Control Channel Structure and TP," 3GPP TSG RAN1 #44, R1-060378, Feb. 2006, 7 pages.
Ericsson, et al., "DL Control Channel Structure," 3GPP Draft, R1-071820, Apr. 2007, 3 pages.
Panasonic, "CCE aggregation size and transport format signaling," 3GPP TSG-RAN WG1 Meeting #50, R1-073608, Aug. 2007, 8 pages.
LG Electronics, "Consideration on the amount of control channel overhead in downlink," 3GPP TSG RAN WG1 #49, R1-072353, May 2007, 5 pages.
Motorola, "Downlink Acknowledgment and Group Transmit Indicator Channels," 3GPP TSG RAN1 #45, R1-061165, May 2006, 4 pages.
Samsung, "DL ACK/NACK signalling," 3GPP RAN WG1 LTE Ad Hoc, R1-061697, Jun. 2006, 5 pages.
Via Telecom, "Hybrid CDM/TDM Structure for UL E-DCH," 3GPP TSG-RAN WG1 #38-bis, R1-041162, Sep. 2004, 3 pages.
European Patent Office Application Serial No. 07833138.6, Search Report dated Feb. 21, 2014, 10 pages.
European Patent Office Application Serial No. 07833139.4, Search Report dated Mar. 4, 2014, 7 pages.
Samsung, "Rules for mapping VRBs to PRBs," 3GPP RAN WG1 Meeting #44bis, R1-060808, Mar. 2006, 5 pages.
Ericsson, et al., "E-URA Downlink Control Signaling—Overhead Assessment," TSG-RAN WG1 #44, R1-060573, Feb. 2006, 7 pages.
United States Patent and Trademark Office U.S. Appl. No. 13/014,665, Office Action dated Feb. 13, 2014, 18 pages.
NTT DoCoMo, et al., "ACK/NACK Signal Structure in E-UTRA Downlink," 3GPP TSG RAN WG1 Meeting #48, R1-070867, Feb. 2007, 3 pages.
LG Electronics, "Allocation of UL ACK/NACK index," 3GPP TSG RAN WG1 #49, R1-072348, May 2007, 4 pages.
European Patent Office Application Serial No. 14152103.9, Search Report dated Mar. 6, 2014, 7 pages.
Su, W., et al., "Obtaining full-diversity space-frequency codes from space-time codes via mapping," IEEE Transactions on Signal Processing, vol. 51, No. 11, pp. 2903-2916, Nov. 1, 2003; XP-011102805.
Samsung, "Transmit Diversity for 4-Tx Antenna", 3GPP TSG RAN WG1 Meeting #49, R1-072238, May 7, 2007, XP-002578959.
Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.
Kim, I.G., et al., "Transmit Diversity and Multiplexing Methods for 3G-LTE Downlink Control Channels," 64th IEEE Vehicular Technology Conference, Sep. 2006, XP-031051218.
Ryu, H.G., "System Design and Analysis of MIMO SFBC CI-OFDM System against the Nonlinear Distortion and Narrowband Interference," IEEE Transactions on Consumer Electronics, vol. 54, No. 2, pp. 368-375, May 2008.
Ryu, H.G., et al., "Design and Performance Evaluation of the MIMO SFBC CI-OFDM Communication System," The Fourth International Conference on Wireless and Mobile Communications, pp. 60-64, Jul. 2008.
Panasonic, "Mapping Positions of Control Channel for Uplink SC-FDMA", TSG-RAN WG1 #43, Doc. No. R1-051395, XP-002450961, Nov. 7, 2005.
3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007.
Zhang, W., et al., "Universal Space-Frequency Block Coding for MIMO-OFDM Systems", IEEE Asia-Pacific Conference on Communications, pp. 227-231, Oct. 5, 2005.
Zhang, M., et al., "Space-Frenquency Block Code with Matched Rotation MIMO-OFDM System with Limited Feedback", EURASIP Journal on Advances in Signal Processing, Jun. 24, 2009.

* cited by examiner

* the number n is equal to or greater than the number m ($n \geq m$) and a transmission interval of the information about the number m is greater than a transmission interval of the information about the number n.

METHOD FOR RECEIVING CONTROL INFORMATION IN ORTHOGONAL FREQUENCY DIVISION MULTIPLEXING SYSTEM OF MOBILE COMMUNICATION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is *a continuation reissue application of U.S. Reissue application Ser. No. 13/941,277, filed Jul. 12, 2013, now U.S. Pat. No. RE44,928, which is an application for reissue of U.S. Pat. No. 8,009,760 B2 issued from U.S. patent application Ser. No. 12/942,968, filed on Nov. 9, 2010, which is* a continuation of U.S. *patent* application Ser. No. 12/143,647, filed Jun. 20, 2008, [currently pending] *now U.S. Pat. No. 8,019,017*, which claims the benefit of earlier filing date and right of priority to Korean *Patent* Application No. 10-2007-0122985, filed on Nov. 29, 2007, and *also claims the benefit of* U.S. Provisional Application Ser. Nos. 60/945,585, filed on Jun. 21, 2007, and 60/946,400, filed on Jun. 27, 2007, the contents of which are *all* hereby incorporated by reference herein in their entirety.

FIELD OF THE INVENTION

The present invention relates to a mobile communication system, and more particularly, to a method for receiving control information in an orthogonal frequency division multiplexing system of the mobile communication system.

BACKGROUND OF THE INVENTION

In a cellular orthogonal frequency division multiplexing (OFDM) radio packet communication system, uplink and downlink data packet transmissions are transmitted via a subframe unit. A subframe is defined as a predetermined time period including a plurality of OFDM symbols. Currently, various control information for uplink/downlink data packet transmissions are also transmitted. Such control information includes information necessary for transmitting and receiving the uplink/downlink data packets, such as radio resource information used for transmitting and receiving the uplink/downlink data packets, a coding scheme, and a modulation scheme, for example. The control information is transmitted using at least one of the plurality of OFDM symbols included in the subframe.

A plurality of mobile terminals may communicate through one base station in a cellular OFDM radio packet communication system. Accordingly, scheduling for allocating radio resources for each of the plurality of mobile terminals is required. In particular, for a downlink control channel transmission, control information for the plurality of mobile terminals may be transmitted together. Thus, scheduling for allocating radio resources for the control information transmission is also required. Therefore, such scheduling information is also transmitted.

Among the plurality of OFDM symbols included in the subframe, the number of OFDM symbols used in transmitting the control information and/or the scheduling information may be varied per subframe according to a communication environment, the amount of control channel information, and the amount of scheduling information, etc. Thus, such information should be informed to a receiver. If errors occur in receiving the control information and the scheduling information, it is quite probable that errors occur in receiving the data of the corresponding subframe. Accordingly, what is needed is a system that overcomes the deficiencies of the prior art, such that control information and scheduling information can be decoded with a high success rate.

SUMMARY OF THE INVENTION

The present invention is directed to a method for receiving control information in an orthogonal frequency division multiplexing system of a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving control information in an orthogonal frequency division multiplexing (OFDM) system of a mobile communication system, the method comprising receiving information related to a number of OFDM symbols in a subframe for receiving first control information, receiving information related to a number of OFDM symbols in the subframe for receiving second control information, decoding the first control information according to the received information related to the number of OFDM symbols in the subframe for receiving the first control information, and decoding the second control information according to the received information related to the number of OFDM symbols in the subframe for receiving the second control information, wherein the number of OFDM symbols for receiving the first control information is less than or equal to the number of OFDM symbols for receiving the second control information.

Preferably, the second control information is not decoded if the number of OFDM symbols for receiving the first control information is greater than the number of OFDM symbols for receiving the second control information.

In one aspect of the invention, the method further comprises decoding the second control information using all possible numbers of OFDM symbols in the subframe for receiving the second control information if the number of OFDM symbols for receiving the first control information is greater than the number of OFDM symbols for receiving the second control information. In another aspect of the invention, the method further comprises decoding the second control information using all possible numbers of OFDM symbols in the subframe for receiving the second control information greater than or equal to the number of OFDM symbols for receiving the first control information if the number of OFDM symbols for receiving the first control information is greater than the number of OFDM symbols for receiving the second control information.

Preferably, the first control information comprises an ACK/NACK signal and the second control information comprises a physical downlink control channel. Preferably, the information related to the number of OFDM symbols in the subframe for receiving the first control information is received via a broadcast channel. Preferably, the information related to the number of OFDM symbols in the subframe for receiving the second control information is received via a physical control channel format indicator channel. Preferably, the number of OFDM symbols in the subframe for receiving the second control information is 1, 2 or 3.

In accordance with another embodiment of the present invention, a method for transmitting control information in an orthogonal frequency division multiplexing (OFDM) system of a mobile communication system comprises transmitting information related to a number of OFDM symbols in a subframe for transmitting first control information, transmitting information related to a number of OFDM symbols in the subframe for transmitting second control information, transmitting the first control information according to the transmitted information related to the number of OFDM symbols in the subframe for transmitting the first control information, and transmitting the second control information according to the transmitted information related to the number of OFDM symbols in the subframe for transmitting the second control information, wherein the number of OFDM symbols for transmitting the first control information is less than or equal to the number of OFDM symbols for transmitting the second control information.

Preferably, the first control information comprises an ACK/NACK signal and the second control information comprises a physical downlink control channel.

Preferably, the information related to the number of OFDM symbols in the subframe for transmitting the first control information is transmitted via a broadcast channel. Preferably, the information related to the number of OFDM symbols in the subframe for transmitting the second control information is transmitted via a physical control channel format indicator channel. Preferably, the number of OFDM symbols for transmitting the second control information is 1, 2 or 3.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
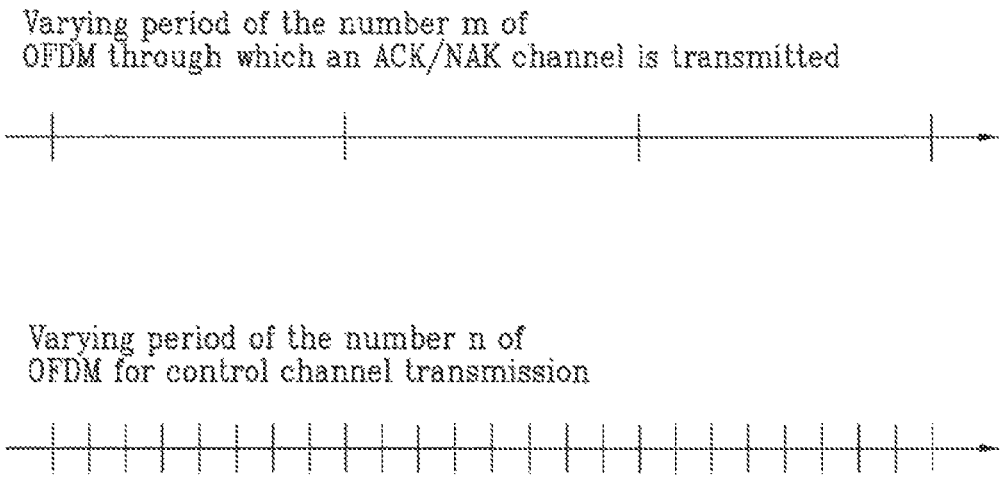
FIG. 1 is a diagram relatively comparing a varying period of the number of OFDM symbols through which an ACK/NAK channel is transmitted (m) with a varying period of the number of OFDM symbols for control channel transmission (n) in accordance with one embodiment of the present invention.

The present invention relates to receiving control information in OFDM system of a mobile communication system.

Hereinafter, the present invention will be described in more detail with reference to the accompanying drawings. The detailed description described below with reference to the accompanying drawings intends to explain exemplary embodiments rather than a sole embodiment where the present invention can be carried out. The detailed description described below includes specific details for assisting in a complete understanding of the present invention. However, those skilled in the art may appreciate that the present invention can be carried out without such specific details of the present invention. For example, although the detailed description described below is explained centering on certain terms, it is not necessarily limited to the terms but the same meanings can be represented thereby even in the case where it is explained by optional terms.

In some cases, the present invention may omit a publicly known structure or apparatus in order to avoid obscurity of the present invention, and the present invention may be presented via a block view and/or a flow chart centering on the core function of each structure and/or apparatus. Also, like reference numerals refer to like elements throughout the specification.

The below embodiments are the embodiments in which the constituents of the present invention and the properties are coupled to each other in a predetermined shape. Each constituent or property should be selectively considered so far as there are not any specific mentions thereof. Each constituent or property may be carried out in a shape that they are not coupled to another constituent or property. Also, the embodiments of the present invention may be configured by combining some constituents and/or properties. The order of the operations explained in the embodiments of the present invention may be changed. Some constitution or property of any embodiment may be included in another embodiment, or may be replaced by the constitution or property corresponding to another embodiment.

The embodiments of the present invention are explained centering on a data transmitting/receiving relationship between a base station and a mobile terminal. Herein, the base station is a terminal node of a network directly performing a communication with the mobile terminal. The specific operation explained to be performed by the base station may be performed by an upper node of the base station according to circumstances. In other words, various operations performed for communication with the mobile terminal in a network configured of a plurality of network nodes including the base station may be performed by the base station or another network node other than the base station. The "base station" may be replaced by terms, such as fixed station, Node B, enode B, eNB, and access point, for example. Also, the "mobile terminal" may be replaced by terms, such as User Equipment (UE), Mobile Station (MS), and Mobile Subscriber Station (MSS), for example.

When transmitting packet data in a mobile communication system, a receiving side may notify a transmitting side whether or not the receiving side has received a packet successfully. For example, when packet reception is successful, the receiving side may transmit an ACK signal to inform the transmitting side of the successful reception, therefore allowing the transmitting side to transmit a new packet. When packet reception fails, the receiving side may transmit a NAK signal to the transmitting side to inform the transmitting side of the failed reception. Accordingly, the transmitting side may retransmit the packet to the receiving side.

The operation described above may be referred to as an automatic repeat request (ARQ) operation. An expansion of the ARQ operation may be referred to as a Hybrid ARQ (HARQ) operation, which is capable of raising the efficiency of an entire system. The HARQ operation lowers error probability by combining a retransmission packet with an original packet, and by being coupled with a channel coding scheme. In order to improve performance by applying the HARQ scheme, the HARQ prefers prompt ACK/NAK responses from a receiver as compared to the previous ARQ operation. Therefore, in the HARQ, the ACK/NAK signal may be transmitted in a physical channel signaling manner.

Preferably, downlink ACK/NAK signals, which are a response to data transmitted in the uplink, may be transmitted through "m" number of OFDM symbols of each subframe. Furthermore, it is preferable that the ACK/NAK signals be transmitted through a part of resource elements within the "m" number of OFDM symbols rather than the entire "m" number of OFDM symbols. Herein, for example, the "m" value is a value that may vary according to a degree of cell coverage. Hereinafter, a method for transmitting an ACK/NAK channel through which the ACK/NAK signals are transmitted, and a method for determining OFDM symbols for control channel transmission, will be described in more detail.

FIG. 1 is a diagram relatively comparing a varying period of the number of OFDM symbols through which ACK/NAK channels are transmitted (m) with a varying period of the number of OFDM symbols for control channel transmission (n) in accordance with one embodiment of the present invention. Hereinafter, the embodiments of the present invention will be described for a case where first n OFDM symbols among OFDM symbols in one subframe of a downlink transmission time interval (TTI) unit of an OFDM system (e.g., a 3GPP LTE OFDM radio communication system) are used for transmitting uplink/downlink scheduling signals and other control signals.

In accordance with the present invention, "n" represents the number of OFDM symbols used for control channel transmission. A maximum number of OFDM symbols for control channel transmission is denoted by the value "N". The "n" value may vary per subframe according to the amount of uplink/downlink control signals and/or the amount of scheduling signals to be transmitted to the uplink. For example, if N=3, then n may be determined by a natural number less than or equal to 3 ($n \leq N$, where N=3).

As described above, because the "n" value may vary per subframe, the base station transmits a control channel format indicator (CCFI) indicating information associated with the "n" value through a physical control channel format indicator channel (PCFICH) to inform the mobile terminals of the "n" value in each subframe. For example, the CCFI may be transmitted through a first OFDM symbol of the subframe.

As described above, the "m" value, which is the number of OFDM symbols through which the ACK/NAK channel is transmitted, may also vary. However, the number of OFDM symbols through which the ACK/NAK is transmitted on the downlink may be controlled by cell coverage. Therefore, it is not necessary for the "m" to frequently change for each cell. Moreover, if the number of OFDM symbols through which the ACK/NAK is transmitted varies per subframe similar to the number of OFDM symbols for control channel transmission, it may be difficult to relate the uplink data transmission of each mobile terminal with the ACK/NAK channels through which the ACK/NAK signals of the data are transmitted.

Therefore, in accordance with the present invention, it is preferable that the number of OFDM symbols through which the ACK/NAK channel is transmitted (m) vary over a larger period than a period that the number of OFDM symbols for control channel transmission (n) varies independently from the number of ACK/NAK signals actually transmitted in an optional subframe. In other words, as shown in FIG. 1, it is preferable to set the number of OFDM symbols through which the ACK/NAK channel is transmitted (m) to be relatively semi-static as compared to the number of OFDM symbols for control channel transmission (n) that can be variously set per subframe.

Preferably, in order for the mobile terminals to receive the ACK/NAK signals, an allocation structure of the ACK/NAK channels should be known so that the base station may notify the mobile terminals of the "m" value through an upper layer RRC message or a broadcast channel with a slower period than the "n" value. Differently therefrom, the "n" value may be transmitted per subframe through the CCFI as described above.

Figure 2:
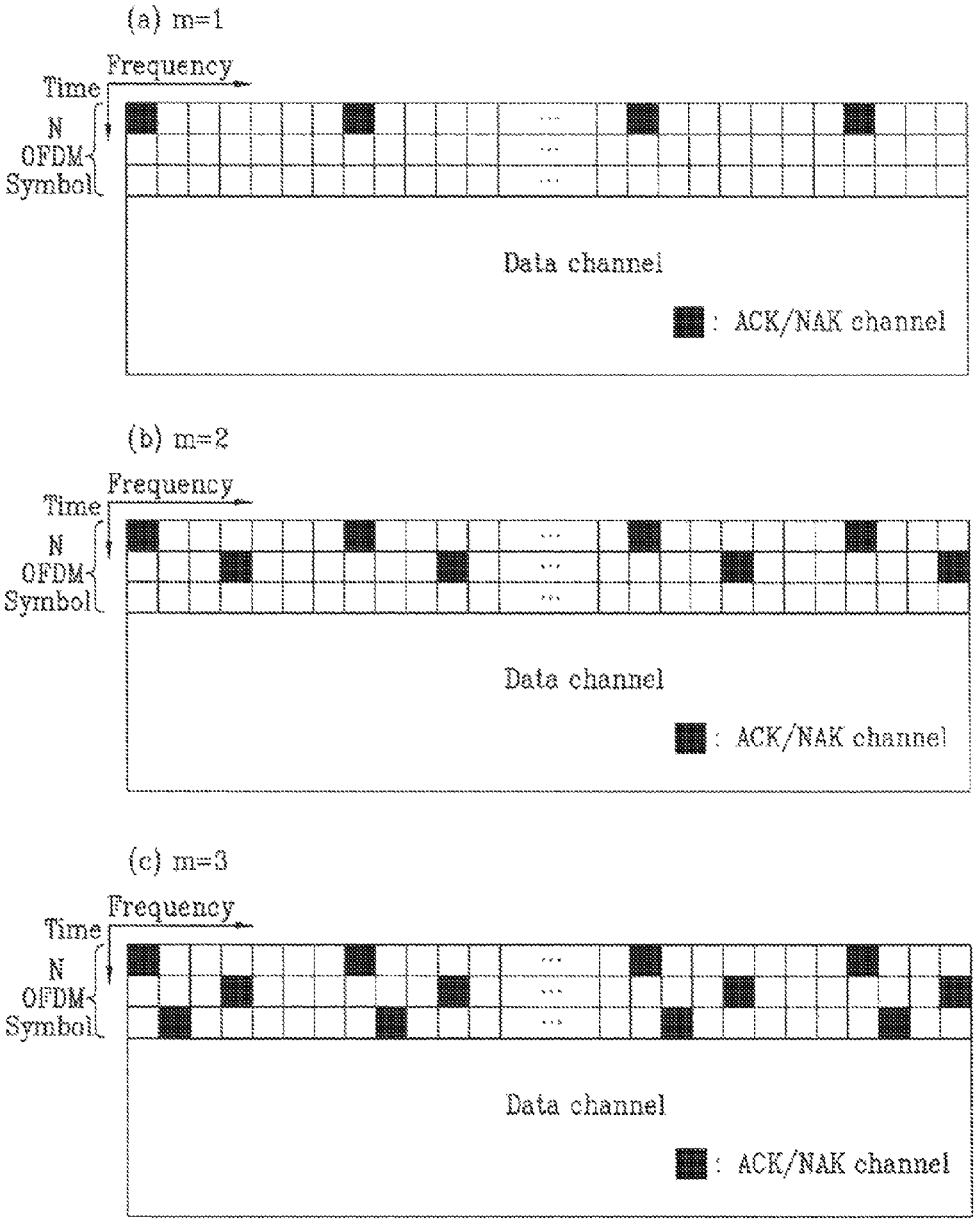
FIG. 2 is a diagram illustrating one example of a method for allocating the transmission of OFDM symbols of a control channel and an ACK/NAK channel in an orthogonal frequency division multiplexing (OFDM) system in accordance with one embodiment of the present invention.

FIG. 2 is a diagram illustrating one example of a method for allocating the transmission of OFDM symbols of a control channel and ACK/NAK channels in an orthogonal frequency division multiplexing (OFDM) system in accordance with one embodiment of the present invention.

In accordance with the present invention, a number of OFDM symbols through which the ACK/NAK channel is transmitted (m) is set as a minimum value within a varying range of the number of OFDM symbols for control channel transmission (n) that may vary per subframe. Preferably, the number "m" of OFDM symbols varies semi-statically. Accordingly, the number of OFDM symbols for control channel transmission (n) may be selected among values within a range from the number of OFDM symbols through which the ACK/NAK channel is transmitted (m) to the maximum number of OFDM symbols for control channel transmission (N). This relationship is represented by Equation (1).

$$m \leq n \leq N \tag{1}$$

In Equation (1), "m" represents the number of OFDM symbols through which the ACK/NAK channel is transmitted, "n" represents the number of OFDM symbols for control channel transmission, and "N" represents the maximum number of OFDM symbols for control channel transmission. Here, the ACK/NAK channel is allocated to first m OFDM symbols. Moreover, like the "N" value, a maximum number of OFDM symbols through which the ACK/NAK channel is transmitted (M) may be previously determined. Accordingly, the "m" value may be within a range from 0 to M. Preferably, the "M" value is less than or equal to the "N" value.

If the "n" value varies per subframe using the above-described method, and although the amount of time/frequency resources within the "n" number of OFDM symbols capable of being allocated to the ACK/NAK channel in one subframe also varies, the number of OFDM symbols for control channel transmission may be varied within a limited range per subframe while a structure of the ACK/NAK channel is semi-statically fixed in accordance with one embodiment of the present invention. Examples of the varying range of the "n" value according to the "M" value will be described with reference to FIG. 2.

FIG. 2(a) is a diagram illustrating an example that the number of OFDM symbols through which the ACK/NAK channel is transmitted (m) is 1. In the example that m=1, the ACK/NAK channel is transmitted through predetermined resource elements within a first OFDM symbol of each subframe, and the "n" value may vary within a range from 1 to 3 per subframe.

FIG. 2(b) is a diagram illustrating an example that the number of OFDM symbols through which the ACK/NAK channel is transmitted (m) is 2. In the example that m=2, the ACK/NAK channel is transmitted through predetermined resource elements within first and second OFDM symbols of each subframe, and the "n" value may vary within a range from 2 to 3 per subframe.

FIG. 2(c) is a diagram illustrating an example that the number of OFDM symbols through which the ACK/NAK channel is transmitted (m) is 3. In the example that m=3, the ACK/NAK channel is transmitted through predetermined resource elements within first, second and third OFDM symbols of each subframe. In this particular case, the "n" value is fixed at 3.

Through the above described method, the number of OFDM symbols for control channel transmission may be varied within a limited range per subframe while a structure of the ACK/NAK channel is semi-statically fixed, wherein control signals are transmitted on the control channel. Also, if the ACK/NAK channel transmission is performed using the OFDM symbols for control channel transmission as above, downlink data transmitted through OFDM symbols other than the OFDM symbols for control channel transmission and ACK/NAK signals are multiplexed to be transmitted in each subframe. Accordingly, complication in setting data transmission power is prevented.

Figure 3:
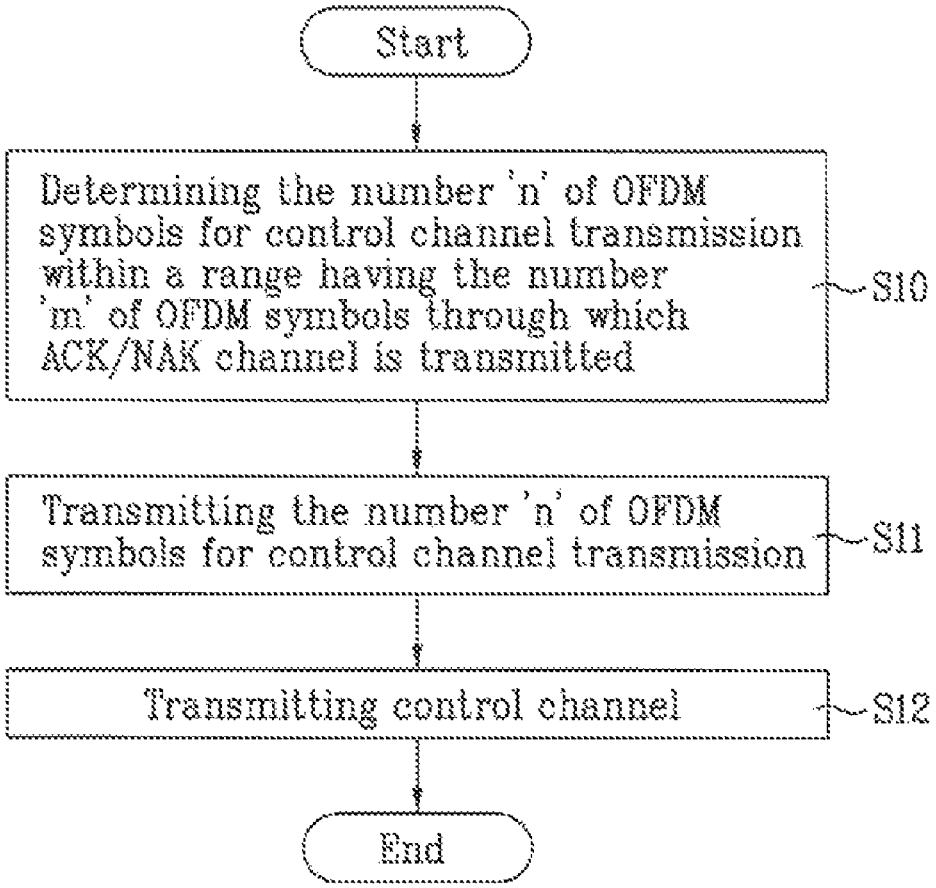
FIG. 3 is a flow chart illustrating one example of a method for transmitting information on the number of OFDM symbols for control channel transmission (n) and a control channel from a base station in accordance with one embodiment of the present invention.

FIG. 3 is a flow chart illustrating one example of a method for transmitting information on the number of OFDM symbols for control channel transmission (n) and a control channel from a base station in accordance with one embodiment of the present invention.

Initially, a base station may determine the number of OFDM symbols for control channel transmission (n) within a range of minimizing the number of OFDM symbols through which the ACK/NAK channel is transmitted (m) by considering the number of OFDM symbols through which a predetermined ACK/NAK channel is transmitted (S10). Here, the "n" value is preferably less than or equal to the maximum number of OFDM symbols for control channel transmission (N), as described above.

Thereafter, the base station may transmit, to at least one mobile terminal, information regarding the determined number of OFDM symbols for control channel transmission (n) (S11). Finally, the relevant control channel may be transmitted to the at least one mobile terminal (S12).

Particularly, when the ACK/NAK channel is allocated to be transmitted through the maximum number of OFDM symbols for control channel transmission (N) that can be used in transmitting scheduling signals (N=M and m=M), as explained with reference to FIG. 2(c), the "n" value cannot have a value other than n=N. Thus, the "n" value may not be broadcast through the CCFI per subframe. Accordingly, the time/frequency resources reserved for CCFI transmission may not be used for CCFI transmission, but may have other uses. Preferably, the time/frequency resources may be extensively used for control signal transmission including the scheduling signals or the ACK/NAK signals.

In the above descriptions, an "n" value and an "m" value do not always exist in a unit of 1 within n≤N and m≤N, respectively. Rather, the values may be selected from a specific natural number set existing within n≤N and m≤N. Herein, the specific natural number set may include 0.

Figure 4:
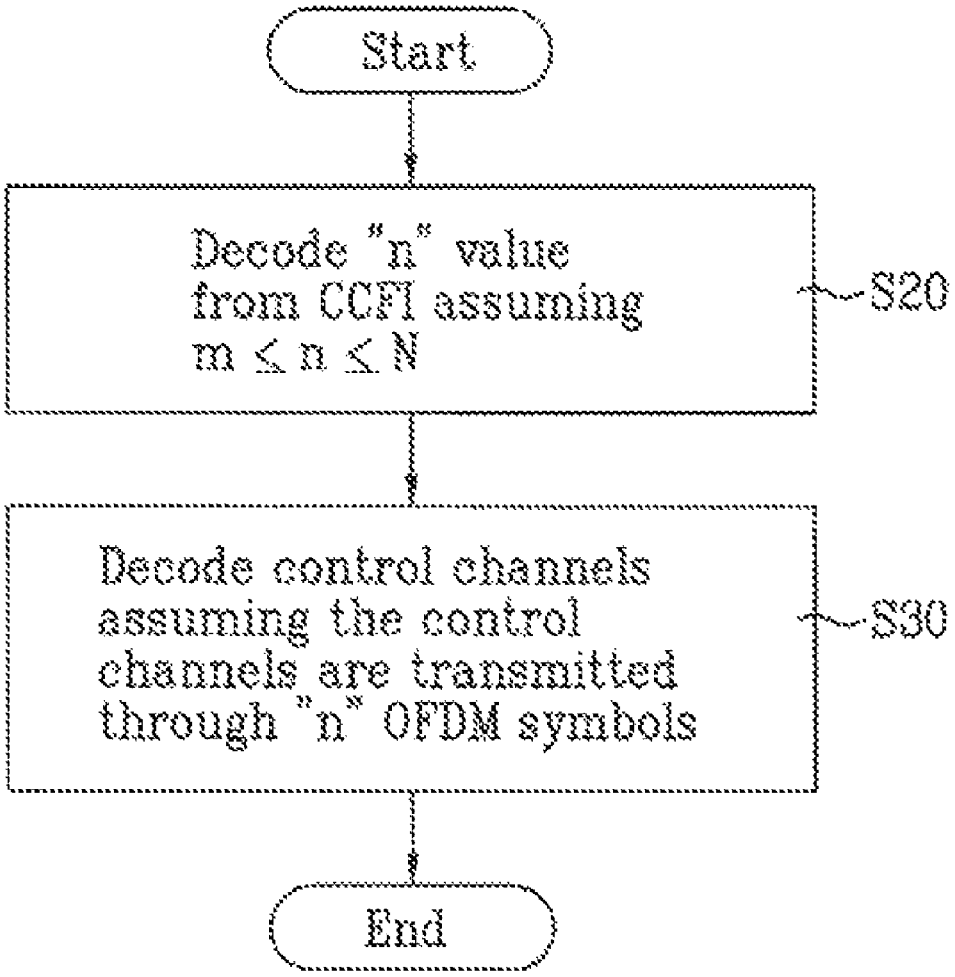
FIG. 4 is a flow chart illustrating one example of a method for receiving information on the number of OFDM symbols for control channel transmission (n) and a control channel in a mobile terminal in accordance with one embodiment of the present invention.

FIG. 4 is a flow chart illustrating one example of a method for receiving information on the number of OFDM symbols for control channel transmission (n) and a control channel in a mobile terminal in accordance with one embodiment of the present invention.

In the present embodiment, the number of OFDM symbols through which the ACK/NAK channel is transmitted (m) is a value that can be semi-statically varied as described above. Preferably, a mobile terminal previously acquires information regarding the number of OFDM symbols through which the ACK/NAK channel is transmitted (m) through an upper layer RRC message or other broadcasting channel before receiving and decoding a corresponding subframe(s).

In accordance with the present invention, the mobile terminal receives CCFI, which is information regarding the number of OFDM symbols for control channel transmission (n), through PCFICH. Here, the number of OFDM symbols for control channel transmission (n) may be varied within a range of minimizing the number of OFDM symbols through which the ACK/NAK channel is transmitted (m) according to one embodiment of the present invention. Preferably, the mobile terminal decodes the received number of OFDM symbols for control channel transmission (n) by obtaining correlation values using expected "n" values that can be the number of OFDM symbols for control channel transmission, etc.

As stated above, the mobile terminal may assume the expected "n" values based on the "m" value previously informed to the mobile terminal according to the present embodiment. Thus, when decoding the "n" value, the mobile terminal may decode the CCFI assuming that the "n" value is within the range of m≤n≤N so that the CCFI decoding outputs the "n" value within the range (S20).

After obtaining the "n" value by the above procedure, a mobile terminal may decode the second control channels assuming the control channels are transmitted through "n" OFDM symbols (S30).

In another aspect of the invention, the mobile terminal may decode the CCFI to obtain the "n" value without considering the expected range of m≤n≤N. Therefore, the mobile terminal may obtain the "n" value which is out of the valid range of m≤n≤N. In this case, the mobile terminal may try to decode control channels for all possible "n" values, or for every possible "n" value within the range of m≤n≤N.

Otherwise, in another example, when the "n" value obtained deviates from the range m≤n≤N, then decoding CCFI is considered to have failed for the particular "n" value. If so, an operation corresponding thereto may be abandoned. For example, the mobile terminal may abandon receiving scheduling signals in the subframe if the "n" value does not satisfy m≤n≤N.

Particularly, as explained with reference to FIG. 2(c), when the already known "m" is equal to the maximum number of OFDM symbols for control channel transmission (N), such that m=N, then the base station does not transmit the CCFI, or the mobile terminal does not decode the CCFI even though the base station transmits the CCFI because the mobile terminal assumes that n=N. Therefore, the mobile terminal may operate assuming that the scheduling signals and other control signals are transmitted through the first N OFDM symbols.

Alternatively, if the already known "m" is equal to the maximum number of OFDM symbols for control channel transmission (N), such that m=N, and if the base station transmits the CCFI, the mobile terminal will decode the CCFI. However, the mobile terminal will assume that n=N regardless of the decoding results. Accordingly, the mobile terminal may also operate assuming that the scheduling signals and other control signals are transmitted through the first N OFDM symbols.

Figure 5:
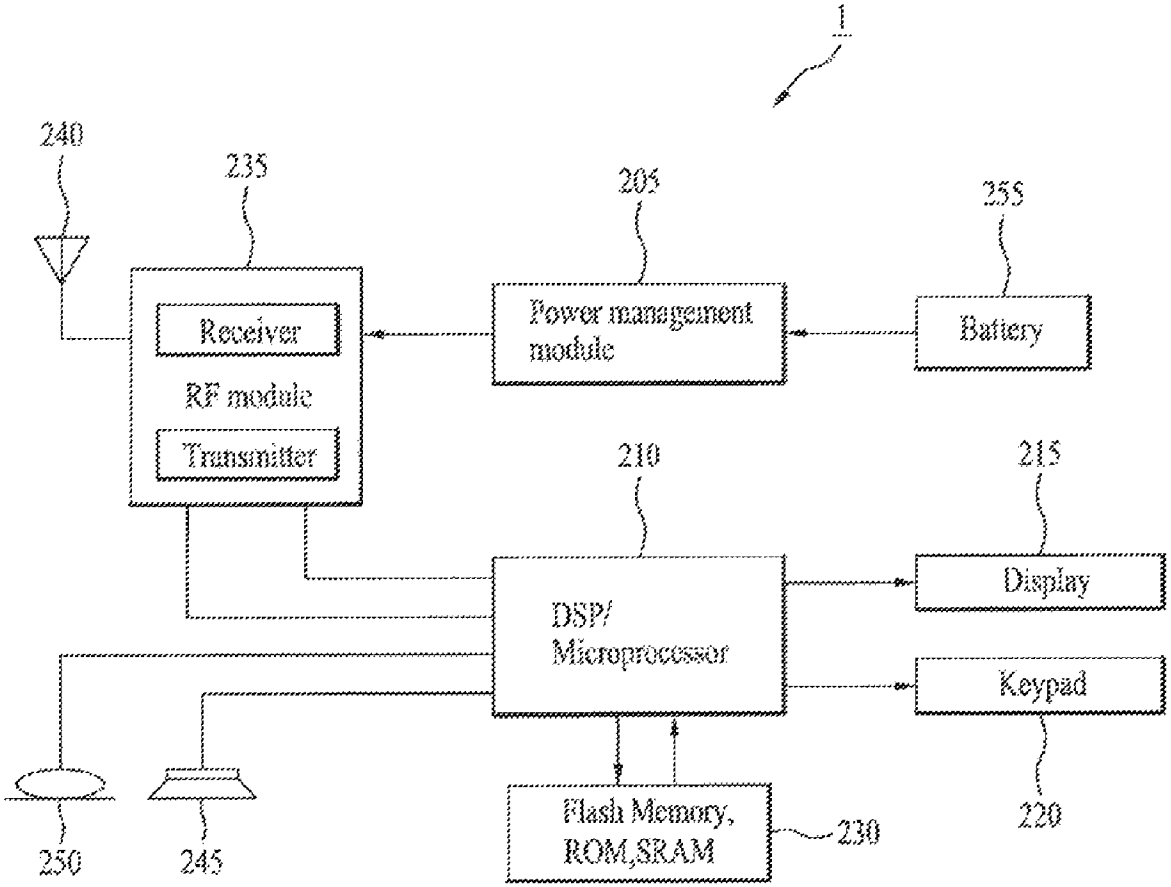
FIG. 5 illustrates a block diagram of a mobile terminal in accordance with the present invention.

FIG. 5 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

Figure 6:
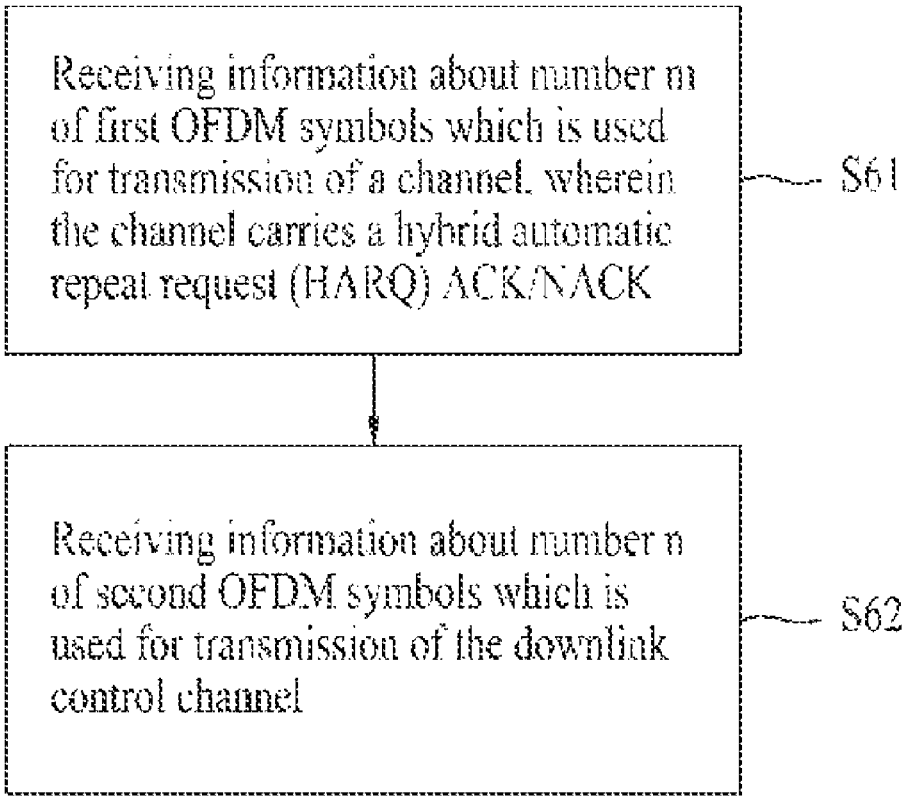
FIG. 6 is a diagram explaining an example of a method for receiving information of OFDM symbols of a downlink control channel in an orthogonal frequency division multiplexing (OFDM) system in accordance with one embodiment of the present invention.

FIG. 6 is a diagram explaining an example of a method for receiving information of orthogonal frequency division multiplexing (OFDM) symbols of a downlink control channel in an OFDM system in accordance with one embodiment of the present invention. Referring to FIG. 6, a mobile terminal receives information about number m of first OFDM symbols which is used for transmission of a channel, wherein the channel carries a hybrid automatic repeat request (HARQ) ACK/NACK (S61). The mobile terminal receives information about number n of second OFDM symbols which is used for transmission of the downlink control channel (S62). In this example, the number n is equal to or greater than the number m (n≥m) and a transmission interval of the information about the number m is greater than a transmission interval of the information about the number n.

It is obvious that embodiments can be configured by combining the claims not having clear citation relations in the claims or new claims may be included in the claims by means of amendments after filing an application.

The embodiments according to the present invention can be implemented by various means, for example, hardware, firmware, software, or a combination thereof, etc. When implemented by the hardware, a method for receiving a control channel according to one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers, micro processors, etc.

When implemented by the firmware or the software, a method for receiving a control channel according to one embodiment of the present invention can be implemented in the shapes of modules, processes, and functions, etc. performing the functions or the operations explained as above. Software codes are stored in a memory unit, making it possible to be driven by a processor. The memory unit is positioned inside or outside the processor, making it possible to exchange data with the processor by means of various means already publicly known.

Although a few embodiments of the present invention have been shown and described, it would be appreciated by those skilled in the art that changes might be made in this embodiment without departing from the principles and spirit of the invention, the scope of which is defined in the claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

[1. A method of transmitting downlink channels at a base station of an orthogonal frequency division multiplexing (OFDM) system, the method comprising:

transmitting first information indicating a size m of a first region through a broadcast channel, wherein the first region is defined by m OFDM symbol(s) starting from a beginning of a subframe and the first region is used for first channels that carry hybrid automatic repeat request (HARQ) ACK/NACKs;

transmitting second information indicating a size n of a second region through a physical control format indicator channel (PCFICH), wherein the second region is defined by n OFDM symbol(s) starting from the beginning of the subframe and the second region is used for second channels that carry downlink control information; and transmitting the HARQ ACK/NACKs and the downlink control information through the first channels and second channels, respectively, wherein first resources for the first channels are identified from the first information, and second resources for the second channels are identified from remaining resources excluding the first resources within the second region, and wherein the second channels are physical downlink control channels (PDCCHs).]

[2. The method of claim 1, wherein the size n is configured to be equal to or greater than the size m such that n≥m.]

[3. A method of receiving downlink channels at a mobile terminal of an orthogonal frequency division multiplexing (OFDM) system, the method comprising:

receiving first information indicating a size m of a first region through a broadcast channel, wherein the first region is defined by m OFDM symbol(s) starting from a beginning of a subframe and the first region is used for first channels that carry hybrid automatic repeat request (HARQ) ACK/NACKs;

receiving second information indicating a size n of a second region through a physical control format indicator channel (PCFICH), wherein the second region is defined by n OFDM symbol(s) starting from the beginning of the subframe and the second region is used for second channels that carry downlink control information; and receiving the HARQ ACK/NACKs and the downlink control information through the first channels and second channels, respectively, wherein first resources for the first channels are identified from the first information, and second resources for the second channels are identified from remaining resources excluding the first resources within the second region, and wherein the second channels are physical downlink control channels (PDCCHs).]

[4. The method of claim 3, wherein the size n is configured to be equal to or greater than the size m such that n≥m.]

[5. The method of claim 3, further comprising:

performing operations in accordance with one of the second channels received through the second region that is designated to the mobile terminal.]

[6. A base station used in an orthogonal frequency division multiplexing (OFDM) system, the base station comprising:

a radio frequency unit; and a processor, wherein the processor is configured to:

transmit first information indicating a size m of a first region through a broadcast channel, wherein the first region is defined by m OFDM symbol(s) starting from beginning of a subframe and the first region is used for first channels that carry hybrid automatic repeat request (HARQ) ACK/NACKs;

transmit second information indicating a size n of a second region through a physical control format indicator channel (PCFICH), wherein the second region is defined by n OFDM symbol(s) starting from the beginning of the subframe and the second region is used for second channels that carry downlink control information; and transmit the HARQ ACK/NACKs and the downlink control information through the first channels and second channels, respectively, wherein first resources for the first channels are identified from the first information, and second resources for the second channels are identified from remaining resources excluding the first resources within the second region, and wherein the second channels are physical downlink control channels (PDCCHs).]

[7. The base station of claim 6, wherein the size n is configured to be equal to or greater than the size m such that n≥m.]

[8. A mobile terminal used in an orthogonal frequency division multiplexing (OFDM) system, the mobile terminal comprising:

a radio frequency unit; and a processor, wherein the processor is configured to: receive first information indicating a size m of a first region through a broadcast channel, wherein the first region is defined by m OFDM symbol(s) starting from a beginning of a subframe and the first region is used for first channels that carry hybrid automatic repeat request (HARQ) ACK/NACKs;

receive second information indicating a size n of a second region through a physical control format indicator channel (PCFICH), wherein the second region is defined by n OFDM symbol(s) starting from the beginning of the subframe and the second region is used for second channels that carry downlink control information; and receive the HARQ ACK/NACKs and the downlink control information through the first channels and second channels, respectively, wherein first resources for the first channels are identified from the first information, and second resources for the second channels are identified from remaining resources excluding the first resources within the second region, and wherein the second channels are physical downlink control channels (PDCCHs).]

[9. The mobile terminal of claim 8, wherein the size n is configured to be equal to or greater than the size m such as n≥m.]

[10. The mobile terminal of claim 8, wherein the processor is further configured to:

perform operations in accordance with one of the second channels received through the second region that is designated to the mobile terminal.]

*11. A method of receiving downlink signals at a mobile terminal in an orthogonal frequency division multiplexing (OFDM) system, the method comprising:*

*receiving information related to a number m of OFDM symbols, wherein the m OFDM symbols from a beginning of a subframe are used for reception of one or more channels that carry acknowledgement/negative acknowledgement (ACK/NACK) information; and*

*receiving information related to a number n of OFDM symbols, wherein the n OFDM symbols from the beginning of the subframe are used for reception of one or more channels that carry scheduling information,*

*wherein:*

*each of n and m is an integer that is equal to or greater than 1;*

*n is equal to or greater than m; and*

*a transmission interval of the information related to m is greater than a transmission interval of the information related to n.*

*12. The method of claim 11, wherein:*

*the information related to m is received via a channel for broadcast; and*

*the information related to n is received via a channel that carries an indicator related to a control channel format.*

*13. The method of claim 11, wherein:*

*the information related to m is received via a radio resource control (RRC) signal; and*

*the information related to n is received via a first OFDM symbol of every subframe.*

*14. A method of transmitting downlink signals at a base station in an orthogonal frequency division multiplexing (OFDM) system, the method comprising:*

*transmitting information related to a number m of OFDM symbols, wherein the m OFDM symbols from a beginning of a subframe are used for transmission of one or more channels that carry acknowledgement/negative acknowledgement (ACK/NACK) information; and*

*transmitting information related to a number n of OFDM symbols, wherein the n OFDM symbols from the beginning of the subframe are used for transmission of one or more channels that carry scheduling information,*

*wherein:*

*each of n and m is an integer that is equal to or greater than 1;*

*n is equal to or greater than m; and*

*a transmission interval of the information related to m is greater than a transmission interval of the information related to n.*

*15. The method of claim 14, wherein:*

*the information related to m is transmitted via a channel for broadcast; and*

*the information related to n is transmitted via a channel that carries an indicator related to a control channel format.*

*16. The method of claim 14, wherein:*

*the information related to m is transmitted via a radio resource control (RRC) signal; and*

*the information related to n is transmitted via a first OFDM symbol of every subframe.*

*17. A mobile station used in an orthogonal frequency division multiplexing (OFDM) system, the mobile station comprising:*

*a radio frequency unit; and*

*a processor configured to cause the radio frequency unit to:*

*receive information related to a number m of OFDM symbols, wherein the m OFDM symbols from a beginning of a subframe are used for reception of one or more channels that carry acknowledgement/negative acknowledgement (ACK/NACK) information; and*

*receive information related to a number n of OFDM symbols, wherein the n OFDM symbols from the beginning of the subframe are used for reception of one or more channels that carry scheduling information,*

*wherein:*

*each of n and m is an integer that is equal to or greater than 1;*

*n is equal to or greater than m; and*

*a transmission interval of the information related to m is greater than a transmission interval of the information related to n.*

*18. The mobile station of claim 17, wherein:*

*the information related to m is received via a channel for broadcast; and*

*the information related to n is received via a channel that carries an indicator related to a control channel format.*

*19. The mobile station of claim 17, wherein:*

*the information related to m is received via a radio resource control (RRC) signal; and*

*the information related to n is received via a first OFDM symbol of every subframe.*

*20. A base station used in an orthogonal frequency division multiplexing (OFDM) system, the base station comprising:*

*a radio frequency unit; and*

*a processor configured to cause the radio frequency unit to:*

*transmit information related to a number m of OFDM symbols, wherein the m OFDM symbols from a beginning of a subframe are used for transmission of one or more channels that carry acknowledgement/negative acknowledgement (ACK/NACK) information; and*

*transmit information related to a number n of OFDM symbols, wherein the n OFDM symbols from the beginning of the subframe are used for transmission of one or more channels that carry scheduling information,*

*wherein:*

*each of n and m is an integer that is equal to or greater than 1;*

*n is equal to or greater than m; and*

*a transmission interval of the information related to m is greater than a transmission interval of the information related to n.*

*21. The base station of claim 20, wherein:*

*the information related to m is transmitted via a channel for broadcast; and*

*the information related to n is transmitted via a channel that carries an indicator related to a control channel format.*

*22. The base station of claim 20, wherein:*

*the information related to m is transmitted via a radio resource control (RRC) signal; and*

*the information related to n is transmitted via a first OFDM symbol of every subframe.*

* * * * *